United States Patent
Di Paola

[11] Patent Number: 5,927,818
[45] Date of Patent: Jul. 27, 1999

[54] TRAVELING BUCKLE AND RETRACTOR ASSEMBLY

[75] Inventor: Donald A. Di Paola, Clinton Township, Mich.

[73] Assignee: AlliedSignal Inc., Morristown, N.J.

[21] Appl. No.: 08/250,184

[22] Filed: May 27, 1994

[51] Int. Cl.⁶ .................................................. B60R 21/00
[52] U.S. Cl. ..................... 297/474; 297/473; 280/804; 280/801.2
[58] Field of Search ..................... 297/474, 473, 297/479, 468, 476; 280/804, 807, 808, 801.2, 801.1

[56] References Cited

U.S. PATENT DOCUMENTS

| | | | |
|---|---|---|---|
| 3,262,738 | 7/1966 | Jantzen | 297/474 |
| 3,995,885 | 12/1976 | Plesniarski | 297/474 |
| 4,529,249 | 7/1985 | Ino | 297/474 |
| 5,350,196 | 9/1994 | Atkins | 297/808 |

*Primary Examiner*—Laurie K. Cranmer
*Attorney, Agent, or Firm*—Markell Seitzman

[57] ABSTRACT

A seat belt system (20) for use with a seat (22) movable fore and aft and including a frame member. The system includes: a retractor (42) fixedly mounted to a support member of a vehicle and lockable during an accident, and webbing (44) extending therefrom in dependence with the movement of the seat. A buckle (50) is secured to an end of the webbing for locking engaging with a tongue (52). A holder (54) is attached to the webbing at a predetermined distance from the buckle and also attaches the webbing to the frame member of the seat.

10 Claims, 2 Drawing Sheets

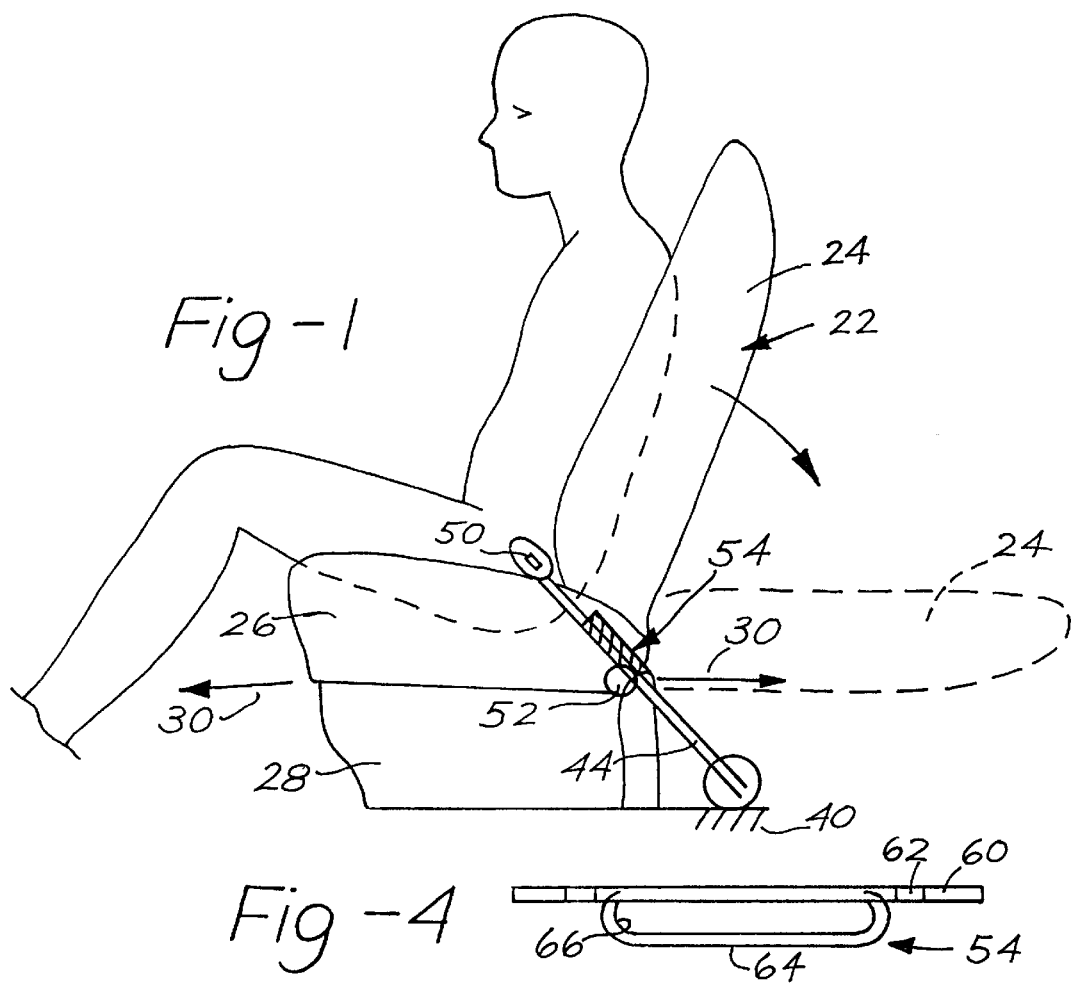
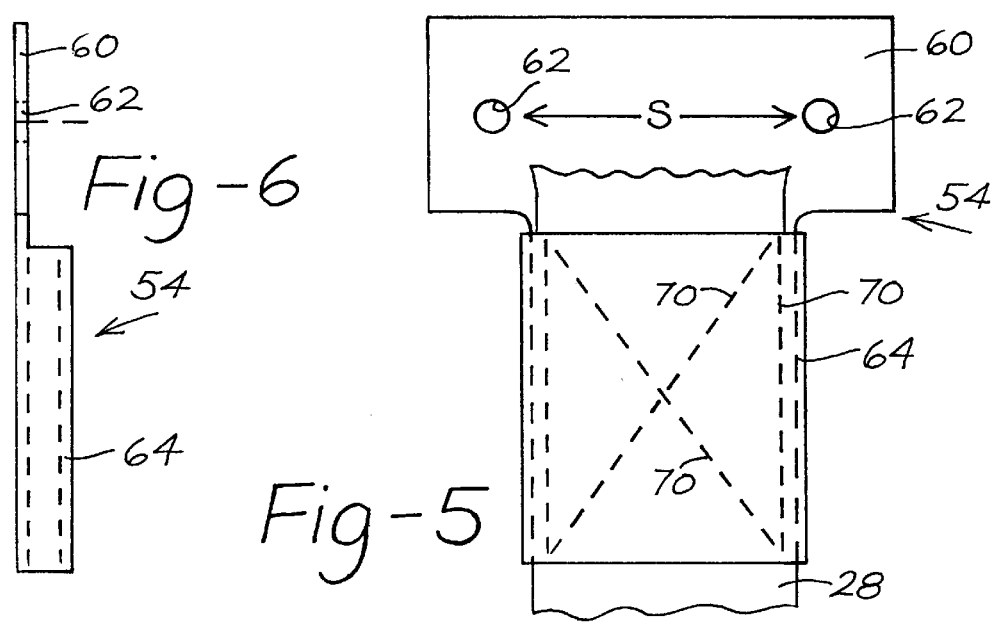

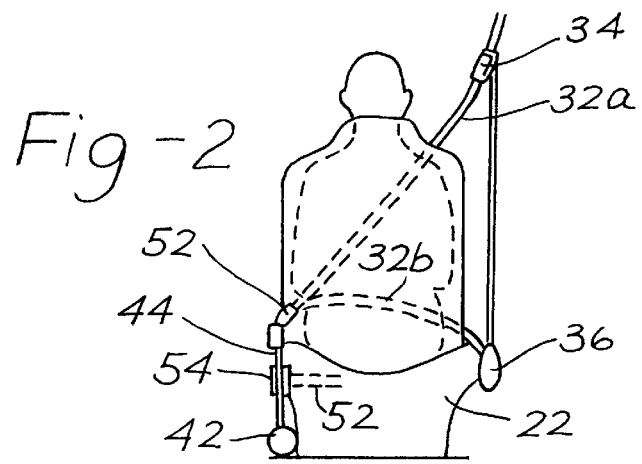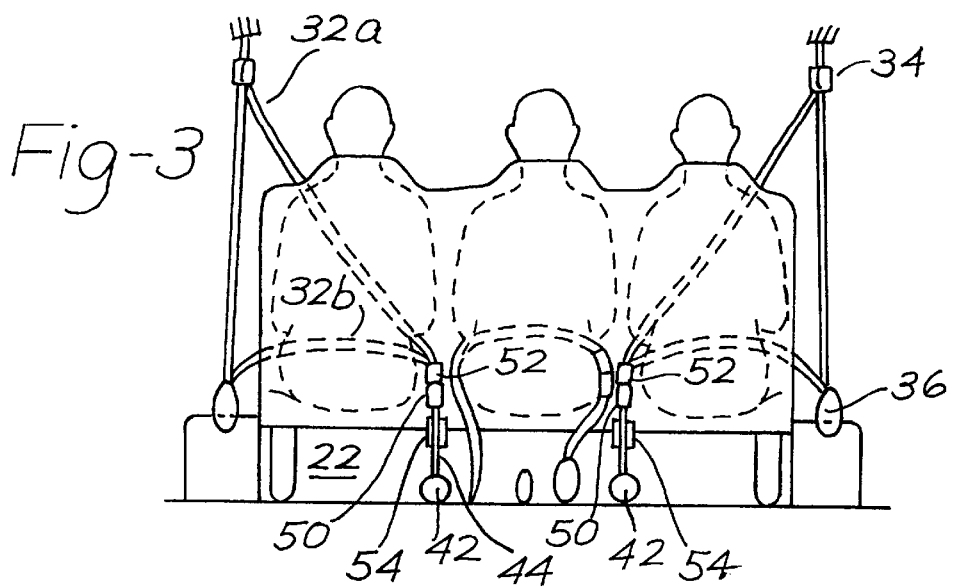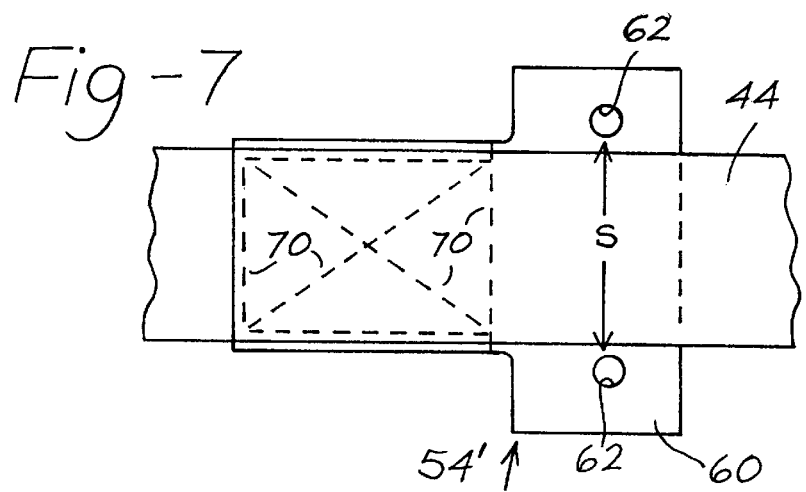

5,927,818

TRAVELING BUCKLE AND RETRACTOR ASSEMBLY

BACKGROUND AND SUMMARY OF THE INVENTION

The present invention generally relates to a seat belt safety restraint and more particularly one that adapted for use with a movable seat.

Typically, seat belt buckles are permanently secured to a structural member within a vehicle. The buckle is maintained slightly above the seating surface of a seat by a sleeve. If the seat is adjustable or movable, the relative position between the buckle and the center line of the occupant will, of course, vary and may exceed a six inch (15.2 cm) limit set forth in certain safety regulations.

It is an object of the present invention to provide a system that may be used with a movable seat such as the rear seat or sofa in a conversion van or other movable type of seat.

Accordingly, the invention comprises: the integration of a buckle and retractor that allow the buckle position to remain generally constant relative to an occupant regardless of the position of the seat. The invention permits the load bearing anchorage to remain on a structural member of the vehicle so that it is not subject to the load bearing capability of either the seat or seat frame.

BRIEF DESCRIPTION OF THE DRAWINGS

In the drawings:

FIG. 1 illustrates a side view of a movable seat incorporating the present invention.

FIG. 2 illustrates a rear view of a seat.

FIG. 3 shows a rear view of a bench or sofa seat.

FIGS. 4–6 illustrates various views of a scabbard used to hold a portion of the seat belt webbing to a seat.

FIG. 7 shows an alternate embodiment of the invention.

DETAILED DESCRIPTION OF THE DRAWINGS

With reference to FIG. 1 there is shown a side view of a rear seat 22 having a seat back 24 and seat cushion 26. If this seat 22 is movable, the cushion 26 is mounted on tracks. The cushion may be supported on a pedestal or base 28 which in turn is mounted to the vehicle, where the tracks are between the seat cushion and the pedestal. In either case the fore and aft seat motion is generally shown by arrows 30.

Secured to the vehicle such as at the floor or B-pillar or other structural component generally shown as 40 is an emergency locking retractor (ELR) 42. As is known, such retractors include sensing mechanisms which, during a crash, prevent the seat belt webbing wound thereabout from being protracted. The webbing is generally shown as 44. As can also be seen, FIG. 1 illustrates a side view of a frame bar 52 or similar structural support incorporated within vehicle seats. This support basically provides structural reinforcement and strength for the seat. The support 52 may be of circular cross-sectional or square or any other shape. Secured to the seat bar 52 is a scabbard, holder or means 54 for securing the webbing 44 to the seat 22. Attached to an end of the webbing 44 is a buckle 50.

Reference is briefly made to FIG. 2 which illustrates a diagrammatic rear, view of the seat 22 showing the placement of the retractor 42. Also shown is a conventional three point belt system including a shoulder/lap belt 32a and 32b, a belt support such as a D-ring 34 and retractor 36. A tongue 52 is connected to the belt in a known way which is engagable with the buckle 50. FIG. 3 shows how the present invention can be incorporated into a rear bench or sofa seat 22 of a vehicle. For purposes of illustration three occupants are shown seated on the seat 22. The outboard seated occupants are restrained by a three point restraint system, such as shown in FIG. 2, having the belts 32a and 332b, the D-ring 34, retractor 36 and tongue 52. The buckle 50 is attached to webbing 44 to a retractor 42 (shown as 42a and 43b). The center occupant is secured by a two point restraint system, which is not pertinent to the present invention.

Reference is briefly made to FIGS. 4–6 which illustrate various views of the holder or scabbard 54. The scabbard 54 includes a mounting plate of flange 60 having a plurality of mounting holes 62 therein. The spacing "s" between these holes is greater than the width of the seat belt webbing 44. Integrally extending from the flange 60 is a tubular sleeve 64 defining a cylindrical opening 66 through which the webbing 44 is threaded. The scabbard 54 may be directly mounted such as by rivets or fasteners to the seat bar 52 or alternatively by straps or brackets. The scabbard 54 may be fabricated of a soft plastic such that the sleeve 64 may be sewn or otherwise permanently attached to the webbing such as by fasteners. FIG. 5 illustrates a plurality of sew seams 70 attaching the webbing to the sleeve 64. The sleeve is attached to the webbing such that there will be approximately 20.3 cm. (8 inches) of webbing between (a) the attachment point of the scabbard 54 to the seat and (b) the lower end of the buckle 50. In a normal installation there may be approximately 51 cm.(20 inches) of webbing between (a) the scabbard and (b) the retractor 42.

One reason for maintaining the spacing between the openings or holes 62 greater than the width of the webbing is to prevent damage of the webbing upon installation of the scabbard through the vehicle seat 22. FIG. 7 illustrates an alternate scabbard 54' made of a flat, T-shaped plastic member shown to the belt 44 in the manner described above. Reference is made to FIG. 1 which is useful in understanding a further benefit of the present invention. Consider for the moment that the seat 22 can be converted into a bed. One such a seat would be used in what is know as a conversion van. To convert this seat into a bed the pedestal or cushion 28 of the seat must be moved forward to provide room for the back of the seat to be laid down horizontally (see dotted lines). Typically to accomplish this conversion of the seat the pedestal must be moved forward about 38.1 cm. (15 inches). If the buckle 50 where permanently anchored to the floor of the vehicle then as the seat is moved forward the buckle would slide relatively rearwards between the seat cushion 26 and the back 24 of the seat (assuming that the configuration of the buckle 50 and retractor 42 shown in FIG. 3 was used). Consequently, the buckle may become hidden or trapped between the cushion and back or pulled therefrom and fall t the floor. When the bed is reconverted into a seat the user must replace the buckle into its normal position, that is, between the cushion and back. This becomes an unnecessary burden to the user and may not be done because of the inconvenience. This deficiency does not occur with the present invention as the buckle travels with the seat and is incapable of being drawn in between the seat parts or dropped therefrom.

In operation, the retractor 42 is attached to the structural member 40 with the webbing 44 routed through the seat back and cushion in the case of a rear bench seat or attached to a side of the seat in the case of a single seat. The buckle 50 is placed on the webbing 44 so that with an occupant in the seat it is within the 15.2 cm (6 inch) limit of the above mentioned safety regulation. The scabbard or holder 54 is attached to the seat frame by any means suitable to the specific application.

When the seat 22 is adjusted fore and aft the webbing is protracted or retracted on the spool of the retractor 42, while the position of the buckle 50 with regard to the occupant does not change. During an accident, the retractor 42 will lock under control of its sensing mechanism preventing the protraction of the webbing 44. Any reaction forces generated during the accident are primarily absorbed at the mounting surface (such as the structural member 40) of the retractor and not at the frame bar or seat support to which the scabbard or holder 54 is connected. Under severe load the scabbard or holder, which may be plastic attached by fasteners, may become dislodged and replacement may be necessary.

I claim:

1. A seat belt system (20) for use with a seat (22) movable fore and aft and including a frame member comprising:

a retractor (42) fixedly mounted to a support member of a vehicle and lockable during an accident, including webbing (44) extending from the retractor capable of being protracted and retracted in dependence with the movement of the seat;

first locking means (50) secured to an end of the webbing for lockingly engaging another locking means (52);

first means (54) attached to the webbing at a predetermined distance from the first locking means and attached to the frame member of the seat and movable with the seat for maintaining the relative position of the first locking means to the seat generally constant regardless of the specific fore aft position of the seat.

2. The apparatus as defined in claim 1 wherein the first means includes a first part (60) attachable to the seat frame and a second part (64) attachable to the webbing.

3. The apparatus as defined in claim 2 wherein the second part (64) includes a sleeve through which the webbing extends.

4. The apparatus as defined in claim 2 where in the first part is attached to the webbing by sewing.

5. The apparatus as defined in claim 1 wherein the first locking means is a seat belt buckle.

6. A seat belt system (20) for use with a seat (22) movable fore and aft and including a frame member comprising.

a retractor (42) fixedly mounted to a support member of a vehicle and lockable during an accident, including webbing (44) extending from the retractor capable of being protracted and retracted in dependence with the movement of the seat;

first locking means (50) secured to an end of the webbing for lockingly engaging another locking means (52);

first means (54) fixedly attached to the webbing at a predetermined distance from the first locking means and attached to the frame member of the seat and movable with the seat for maintaining the relative distance between the first locking means and the frame member generally constant regardless of the position of the seat.

7. The apparatus as defined in claim 6 wherein the first means includes a first part (60) attachable to the seat frame and a second part (64) attachable to the webbing.

8. The apparatus as defined in claim 7 wherein the second part (64) includes a sleeve through which the webbing extends.

9. The apparatus as defined in claim 6 where in the first part is attached to the webbing by sewing.

10. The apparatus as defined in claim 6 wherein the first locking means is a seat belt buckle.

\* \* \* \* \*